Patented Dec. 15, 1925.

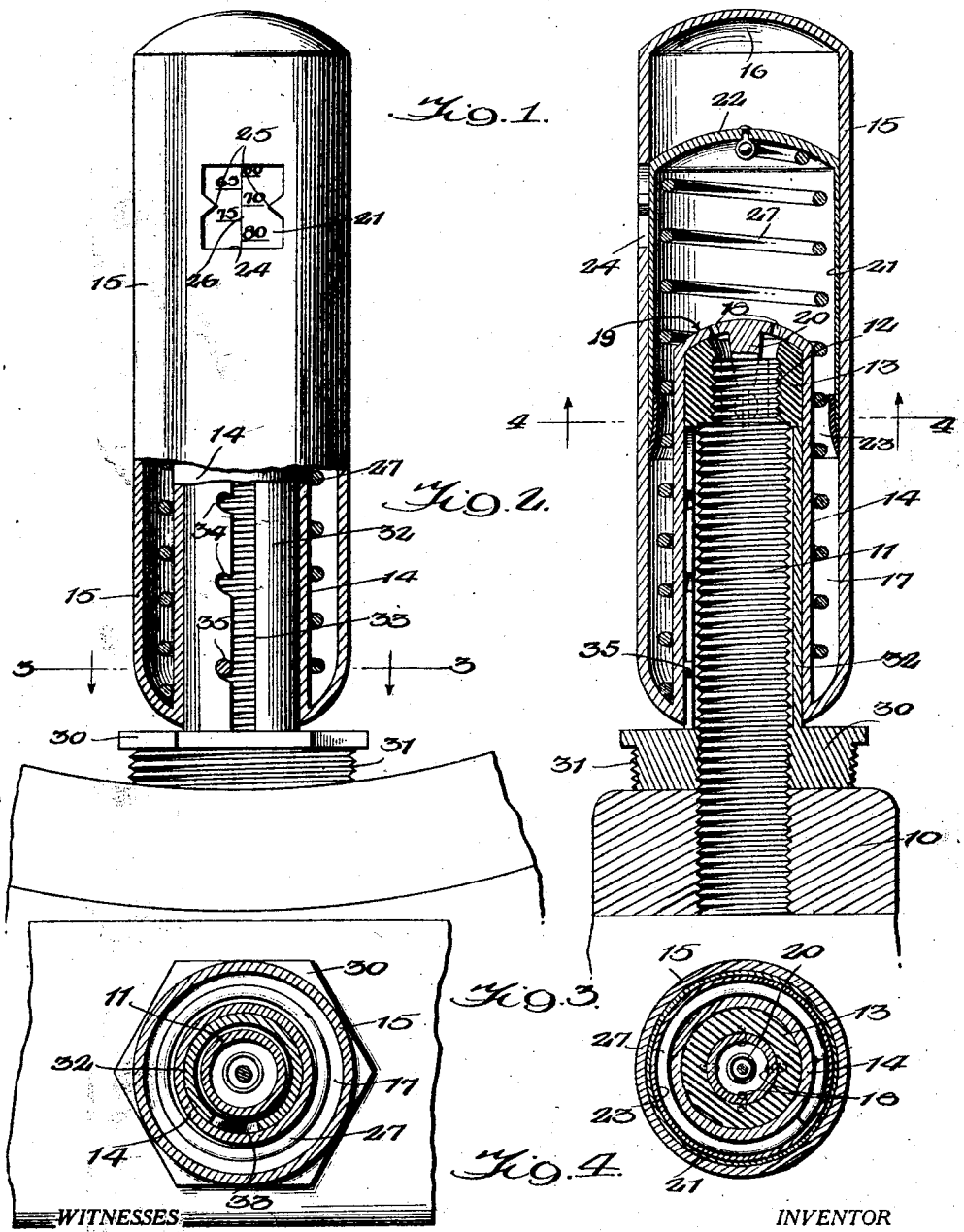

1,565,423

UNITED STATES PATENT OFFICE.

GLENN DAILEY, OF BISON, SOUTH DAKOTA.

PRESSURE INDICATOR.

Application filed February 16, 1924. Serial No. 693,391.

*To all whom it may concern:*

Be it known that I, GLENN DAILEY, a citizen of the United States, and a resident of Bison, in the county of Perkins and State of South Dakota, have invented certain new and useful Improvements in Pressure Indicators, of which the following is a specification.

My present invention relates generally to pressure indicators and more particularly to an improved combination tire gauge and cylinder compression tester, my primary object being the provision of a simple, inexpensive device of this kind which when in use as a tire gauge may be attached to a tire valve stem and permanently carried by the wheel so that but a glance at the indicator from time to time will permit of ascertaining the exact air pressure within the tire, without soiling the hands and clothes so frequently the result of use of the usual hand tester.

A further object is the provision of a device of this character which may be used in a manner similar to the usual hand tester and which may be adapted to the spark plug aperture of a combustion cylinder with ease and facility.

With these general objects in mind, further objects and advantages of my invention, as well as its details of construction and operation, will plainly appear in the course of the following description in which reference is made to the accompanying drawing forming a part of this specification, and in which, Figure 1 is a side view, partly broken away and in section, illustrating the practical application of my invention as a tire gauge, Figure 2 is a vertical longitudinal section taken at right angles to Figure 1, and, Figures 3 and 4 are cross sections taken respectively on lines 3—3 and 4—4 of Figures 1 and 2.

Referring now to these figures, I have shown in Figures 1 and 2, a portion 10 of the felly of a pneumatically tired wheel inwardly through which felly the valve stem 11 of its tire projects. This stem 11 is shown with its usual reduced terminal 12 which in the present instance is received within and against the ring-shaped compressible gasket 13 disposed within the inner, upper end of the valve stem receiving barrel 14.

The barrel 14 just referred to forms a part of the casing of my improved device which also includes an outer shell 15 closed at its outer end as at 16 preferably by an end cap which is brazed or otherwise permanently fixed and said shell is attached at its inner end to the lower open outer end of the barrel 14 so as to form a chamber 17 within the shell which is in communication with the interior of the barrel 14 through openings 18 in the inner end 19 of said barrel. The barrel also has at its said inner end 19 an axially projecting stud 20 which, when the valve stem is within the barrel projects into said stem so as to hold the internal air valve of the stem in open position and permit the tire pressure to enter the chamber 17.

Within the chamber 17 and slidable against the inner surface of the casing shell 15, is an indicating tube 21 whose outer end 22 is closed and whose inner open end has a surrounding flexible sleeve 23 whose close engagement with the inner surface of the casing shell 15 prevents leakage of pressure past the indicating tube. This indicating tube is placed within the casing before the end 16 of the latter is permanently closed. The shell 15 has at one point intermediate its ends a sight opening 24 partly across which opposed indicating fingers 25 extend, this sight opening exposing a portion of the surface of the indicating tube 21 which is graduated as at 26 so as to indicate pounds pressure which vary as the tube is moved outwardly in the casing by the tire pressure or inwardly in the casing by means of a retractile spring 27 connected at its outer end to the outer closed end 22 of the tube 21 and at its inner end to the inner end of the casing adjacent to the point of connection of the shell 15 with the barrel 14 as by means of rivets and the like.

As thus described it is obvious the pressure indicator of my invention is well adapted for use as a hand tester for tires, being especially desirable on account of the complete enclosure of the controlling spring 27 as well as the indicating tube so as to avoid the entrance of dirt, dust and other foreign matter. It is evident for this purpose the sight opening may be covered by any suitable transparent material which will further insure against the entrance of dirt and moisture.

In the use of the indicator as a permanent tire pressure gauge, a clamping nut 30 is screwed upon the valve stem 11 against the felly 10 and this nut is not only internally threaded to engage the stem threads but is externally threaded as at 31 to screw into the spark plug aperture of a combustion cylinder. The nut 30 has moreover an extending sleeve 32 which when positioned around the valve stem 11, snugly surrounds the same within the barrel 14 and is provided with a lengthwise slot 33 and with notches 34 at spaced points along one side of said slot, the barrel 14 having an internal stud 35 for movement through the slot 33 and into one of the notches when the gasket ring 13 is compressed on the valve stem. The provision of several notches 34 insures the locking of the gauge upon valve stems projecting different distances beyond the inner surface of the felly.

It is apparent that however used, my improved gauge permits pressure to find its way into the casing and against the indicating tube and that the amount of pressure may be easily and conveniently read through the sight opening of the casing, thus clearly carrying out the objects first above stated.

I claim:

1. A pressure indicator including a casing having an outer shell provided with a side opening and an inner barrel axially of and spaced from the shell, the barrel having a valve stem receiving end and being connected around its said end with the adjacent end of the shell to form a chamber around the barrel, a tube within the said chamber slidable against the inner surface of the shell, closed at one end and opened at its opposite end toward and around the adjacent end of the barrel, the said last mentioned end of the barrel having openings communicating with the interior of the tube, and the external surface of the tube having graduations exposed through the sight opening of the shell and a spring for controlling movement of the tube within the shell.

2. A pressure indicator including a casing having an outer shell provided with a side opening and an inner barrel axially of and spaced from the shell, the barrel having a valve stem receiving end and being connected around its said end with the adjacent end of the shell to form a chamber around the barrel, a tube within the said chamber slidable against the inner surface of the shell, closed at one end and opened at its opposite end toward and around the adjacent end of the barrel, the said last mentioned end of the barrel having openings communicating with the interior of the tube, and the external surface of the tube having graduations exposed through the sight opening of the shell and a spring for controlling movement of the tube within the shell, the said spring being disposed around the barrel and in connection at one end with the tube wholly within the chamber of the casing and protected at all times by the barrel, the tube and the shell.

3. A pressure indicator having a casing including an inner pressure receiving barrel, a spring controlled indicating tube within the casing in communication with said barrel, and a supporting nut having a sleeve to interfit the barrel, said barrel and said sleeve having relatively engaging means to lock the barrel on the sleeve.

4. A pressure indicator having a casing including an inner pressure receiving barrel, a spring controlled indicating tube within the casing in communication with said barrel, a supporting nut having a sleeve to interfit the barrel, and means to adjustably lock the barrel on the sleeve.

5. A pressure indicator having a casing including an inner pressure receiving barrel, a spring controlled indicating tube within the casing in communication with said barrel, a supporting nut having a sleeve to interfit the barrel, and means to adjustably lock the barrel on the sleeve, said nut being internally and externally threaded for the purpose described.

6. A pressure indicator having a casing including an inner pressure receiving barrel, a spring controlled indicating tube within the casing in communication with said barrel, a supporting nut having a sleeve to interfit the barrel, said sleeve being lengthwise slotted and having notches therein at spaced points alongside its said slot, and a stud extending inwardly from the barrel for movement into said slot and into the said notches.

GLENN DAILEY.